(No Model.)
G. B. HEIDEMAN.
WATER FILTER.
No. 547,547. Patented Oct. 8, 1895.
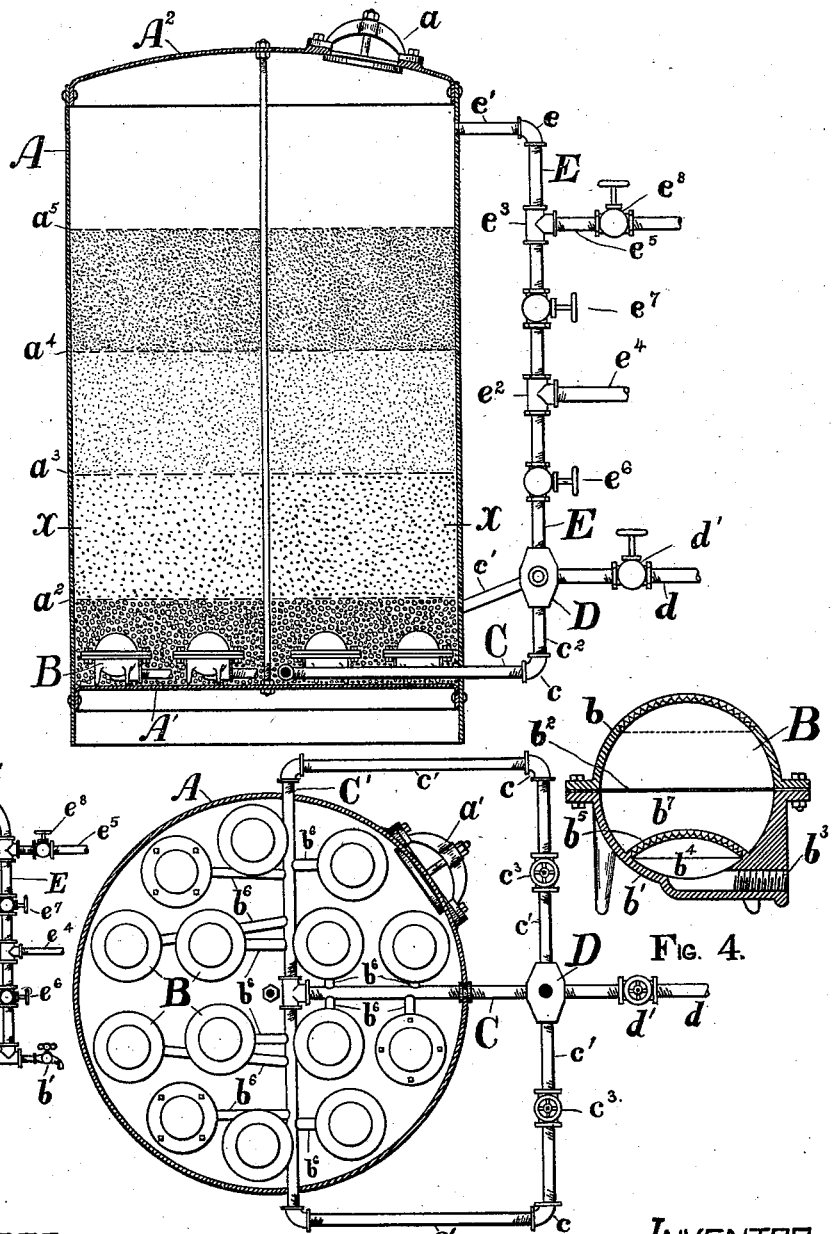
Witnesses.
Howard Ralston.
Emma Lyford.
Inventor.
George B. Heideman
By Geo. J. Murray
Atty.

UNITED STATES PATENT OFFICE.

GEORGE B. HEIDEMAN, OF BELLEVUE, KENTUCKY, ASSIGNOR OF ONE-HALF TO JOHN T. SCHULLER, OF CINCINNATI, OHIO.

WATER-FILTER.

SPECIFICATION forming part of Letters Patent No. 547,547, dated October 8, 1895.

Application filed March 6, 1895. Serial No. 540,712. (No model.)

*To all whom it may concern:*

Be it known that I, GEORGE B. HEIDEMAN, a citizen of the United States, and a resident of Bellevue, in the county of Campbell and State of Kentucky, have invented certain new and useful Improvements in Water-Filters, of which the following is a specification.

My invention relates to means for filtering water and is especially adapted for use in hotels or other places where the water-supply is received through street-mains or other source of supply under pressure.

The invention is also applicable in a simple form for domestic purposes, where the water-supply is impure or requires filtering.

The invention will be first fully described, in connection with the accompanying drawings, and then particularly referred to and pointed out in the claims.

Referring to the drawings, in which like parts are indicated by similar reference-letters wherever they occur throughout the various views, Figure 1 is a central vertical section of my filtering device as applied to hotels and similar places where a large supply of water is required. Fig. 2 is a transverse section of the same, taken through line $x\ x$ of Fig. 1, with the filtering substance removed. Fig. 3 is a vertical sectional view of a smaller device for family or domestic purposes. Fig. 4 is a vertical sectional view upon a greatly-enlarged scale of one of the vessels through which the partially-filtered water passes before it reaches the delivery-port.

Referring first to the form of invention illustrated in Figs. 1 and 2, A represents a cylindrical sheet-metal tank, having the bottom A' and cap or cover $A^2$ secured in place by rivets passing through flanges turned downwardly from the top and bottom and through the cylindrical shell of the tank. The top $A^2$ of the tank has a manhole and cover $a$, of ordinary construction, secured to it upon one side, and the cylindrical shell of the tank is provided with a similar manhole and cover $a'$ near the bottom of the tank.

Upon the bottom of the tank rests a number of filtering-vessels B. These are preferably made in globular form and formed of hemispherical shells $b$ and $b'$, the shell $b'$ being supported upon legs resting on the bottom of the tank, the hemispherical shells being provided with annular flanges perforated to receive bolts, by which the two parts are clamped firmly together.

$b^2$ is a perforated disk of light sheet metal, preferably brass, which divides the globular vessel and is clamped firmly in place between the flanges of the two shells $b$ and $b'$. The lower shell has a tubular portion $b^3$ to receive a pipe communicating with the chamber $b^4$, which chamber is formed by the concavo-convex partition $b^5$, which is perforated, the perforations communicating with the interior spaces of the globe above the partition. The top of the shell $b$ is also perforated, as clearly seen in Fig. 4. The perforations in the top of the shell $b$ and partition $b^5$ are cone-shaped on the under side, terminating in fine perforations at the arch, the cone-shaped portions being formed in molding to lessen the labor of drilling the fine perforations through to meet them.

The filtering-vessels B connect with pipes C and C' by means of short branch pipes $b^6$, the pipes C and C' being arranged near the bottom of the tank and leading to the outside. All of these pipes connect with the five-way coupling D. The branch C' connects by a union with the cross-pipes C, and passing out of the tank at a right angle to the pipe C connects to the union D by means of the elbow and short pipe $c^2$, while the pipe C at each end connects to the union D by elbows $c$ and branch pipes $c'$.

To the top of the unison D is connected a pipe E, which extends upwardly and is connected to the tank near its top by means of an elbow $e$ and the short branch pipe $e'$. In this pipe E are interposed T-unions $e^2$ and $e^3$. To the union $e^2$ is coupled the pipe $e^4$, leading from the main, and to the union $e^3$ is coupled the pipe $e^5$, leading to the sewer or waste-drain, and to the union D is coupled the pipe $d$ for carrying the filtered water wherever it is required. The chamber $b^7$, between the partition $b^5$ and the perforated sheet-metal partition $b^2$, is filled with tightly-packed charcoal or other crushed carbon. The chamber formed by the upper shell $b$ and perforated plate $b^2$ is packed with very coarse clean gravel. The vessels B are covered with gravel up to the dotted line $a^2$ in the tank. Upon top of this is arranged another course of coarse sand up to about the dotted line $a^3$. Upon top of this is another course of sand a grade or so finer up to the dotted line $a^4$, and the top course is of very fine sand up to the dotted line $a^5$, the space above the line $a^5$ being open. All the sand and gravel before being put into the tank A is washed clean and free of all alumina or other loose substances.

In the pipe E are interposed two valves $e^6$ and $e^7$, the valve $e^6$ being interposed between the main supply-pipe and the union D, and the valve $e^7$ being interposed between the main supply-pipe and the sewer-pipe $e^5$. There is also interposed in the pipe $d$ a similar globe-valve $d'$, and in the pipe leading to the sewer is interposed a valve $e^8$, and similar valves $c^3$ are interposed in each of the branches $c'$ leading to the union D. These latter, however, are not essential, but are sometimes convenient.

In operation the valves $e^6$ and $e^8$ are closed, while the valves $e^7$, $c^3$, and $d'$ are open, the water thus being forced through the main $e^4$ in the upper part of the tank A, and passing down through the different strata of filtering material through the filtering-vessels B, thence out through the pipes C and C′ and their branches to the union D, and thence through the discharge-pipe for the clear or filtered water $d$. After the vessel has been used for a considerable time and whenever the filtered water from the discharge-pipe indicates that any impurities are passing through, the impurities may be washed out into the sewer by reversing the valves—thus, the valves $d'$ and $e^7$ are closed and the valves $e^6$ and $e^8$ opened. The water from the main then passes down through the union D and the pipes connected with it, thence through the branches, through the vessels B, through the different strata of filtering material, and the impurities washed out from the upper end of the tank through the branch pipe $e$ discharged through the branch or pipe $e^5$ leading to the sewer. Should it be necessary at any time to remove or replace the different strata of filtering material, the manhole-heads are removed and the material taken out through the lower manhole, the attendant, with a suitable rake or bar introduced through the upper manhole, stirring or forcing the material in the direction of the lower discharge. Then by closing the valves $d'$, $e^6$, and $e^8$ and opening the valve $e^7$ the tank may be thoroughly flushed, the water and other impurities in it being discharged through the lower manhole.

In the form shown in Fig. 3, which is intended for domestic or family use, F represents a section of ordinary cast-metal pipe, the diameter of which may be from four to six or eight inches, having the customary outwardly-projecting flanges, the ends of the pipe being closed by suitable caps. In the bottom of this pipe is placed one of the filtering-vessels B, as before described, and above it in the pipe F the different strata of filtering material, the same as in the larger tank A. The connection between the filtering-vessel and the stand-pipe E is substantially the same as in the former device, and the operation of filtering and cleansing the filtering material is substantially the same as before described.

I have found by experience and practical tests of the different kinds of filtering material that the kind I have described, arranged in the described manner, gives the best result, but good results are attained by varying the material, both as to kind and arrangement; and hence I do not limit myself to the particular kind nor to the particular arrangement of filtering material, as any well-known filtering material used with my tank, filtering-vessels, and the pipe connections for the same will produce good results, and therefore be within the spirit and scope of my invention.

What I claim as new, and desire to secure by Letters Patent, is—

1. The hereinbefore described filtering vessel, B, formed of hemispherical shells, the lower half shell being divided by perforated concavo convex partition, forming a water chamber in the bottom thereof and having connection for a pipe to convey the filtered water from said chamber, the upper half shell having its crown perforated, both half shells having annular connecting flanges, and the perforated diaphragm clamped between said flanges.

2. In a water filter, the combination of the outer case, the filtering vessel, B, resting on the bottom thereof, said vessel being composed of hemispherical shells, each having annular connecting flanges, the perforated diaphragm clamped between said flanges, the crown of the upper shell being perforated, the lower half of said shell having an arched perforated partition forming a water chamber between it and the bottom of the shell, a pipe connection for said chamber, the chamber between the diaphragm and an arched partition being packed with a fine filtering substance, the chamber above the diaphragm being partially filled with coarse gravel, pipe connections for the upper part of the outer case having discharge pipe for the filtered water connected to the lower chamber of the filtering vessel, substantially as shown and described.

3. In a water filter, the combination of the outer case, a filtering vessel composed of two hemispherical shells and a perforated sheet metal partition clamped between said half shells, the lower one of said shells having a perforated partition forming a water chamber below it, and a discharge pipe for the filtered water leading from said chamber, the upper half of the shell being perforated to admit water into the shell, pipe connections for the filtered water leading from said vessel, the pipe connection from the main or water supply leading to the upper portion of the outer case, a filtering material, such as described, in the outer case over the filtering vessel in the bottom thereof, substantially as shown and described.

4. The combination, as hereinbefore set forth, of the outer case, filtering vessels composed of hemispherical shells divided by a perforated partition clamped between the shells and a perforated partition forming the water chamber in the lower half of said vessel, a discharge port for the filtered water leading from said water chamber, pipe connections leading from the filtering vessel to the outside of the case for the filtered water, a supply pipe for the water main leading to the top of said case, a filtering substance, such as charcoal or crushed carbon, packed between the dividing partition and the partition of the water chamber in the lower part of the filtering vessel, filtering material, such as coarse gravel packed in the upper half of the filtering vessel above the dividing partition, a stratum of coarse gravel packed in the case over the filtering vessels, a different stratum of sand of gradually increasing fineness packed in said outer case to near the top thereof.

GEORGE B. HEIDEMAN.

Witnesses:
GEO. J. MURRAY,
EMMA LYFORD.